United States Patent [19]
Suzuki

[11] Patent Number: 5,878,196
[45] Date of Patent: Mar. 2, 1999

[54] PRINTER CONTROL SYSTEM

[75] Inventor: Akihiro Suzuki, Kanagawa, Japan

[73] Assignee: Fuji Xerox Co., Ltd., Tokyo, Japan

[21] Appl. No.: 824,767

[22] Filed: Mar. 26, 1997

[30] Foreign Application Priority Data

Mar. 27, 1996 [JP] Japan .................................. 8-071832

[51] Int. Cl.$^6$ ................................................ G06K 15/00
[52] U.S. Cl. .......................................... 395/114; 395/113
[58] Field of Search .................................. 395/114, 115,
395/116, 113, 101, 112, 164, 296; 340/61,
74, 76, 121; 345/115, 116; 364/520, 518,
519–523, 550; 358/404, 444, 462, 403,
451

[56] References Cited

U.S. PATENT DOCUMENTS

| | | | |
|---|---|---|---|
| 5,131,077 | 7/1992 | Indei | 395/113 |
| 5,220,645 | 6/1993 | Nakajima | 395/113 |
| 5,413,419 | 5/1995 | Oami et al. | 400/61 |

*Primary Examiner*—Jose L. Couso
*Assistant Examiner*—Duy M. Dang
*Attorney, Agent, or Firm*—Finnegan, Henderson, Farabow, Garrett & Dunner, L.L.P.

[57] ABSTRACT

In a printer control system, a monitor unit monitors whether print document data or a print document consisting of a group of such print document data has been received within a given time. A schedule attribute judging unit judges whether the job processing scheduling attribute of the received print document data or print document is a before-complete attribute or an after-complete attribute. In the case of the before-complete attribute, a print document data processing unit is used to process the print document data. On the other hand, in the case of the after-complete attribute, a print document processing unit is used to process the print document. When a job is interrupted, a document addition judging unit is used to judge whether the job interrupted but received later again can be added to the last print document data or to the last print document or not.

3 Claims, 6 Drawing Sheets

PRINTER CONTROL SYSTEM

BACKGROUND OF THE INVENTION

1. Field of the Invention

The present invention relates to a printer control system and, in particular, to a printer control system which carries out the print processing and execution of a printer with a job as the operation unit thereof.

2. Description of the Related Art

In processing a series of documents for printing transmitted from a client, a print server employs a system in which the print outputs of the print server to the printer are processed in a batch (that is, in a job). According to this system, when processing a plurality of documents collectively as a job, it is necessary for the client to transmit a schedule attribute together with an instruction to the effect that the documents must be processed as a job.

This schedule attribute includes a before-complete attribute and an after-complete attribute. The before-complete attribute is an attribute to carry out a scheduling operation of a type in which the processings of a job are to be executed one by one in sequence each time a print server receives an individual piece of print document data. On the other hand, the after-complete attribute is an attribute to carry out a scheduling operation of a type in which, after a print server receives a print document consisting of a batch of all print document data relating to the present job, the processings of the job are to be executed collectively.

By the way, while the print processing is being executed in a job unit in accordance with the above-mentioned schedule attribute, there is a possibility that the transmission of the document being currently transmitted may be interrupted because of the failure of the network or the like, with the result that the request for execution of the job may be thereby interrupted.

Conventionally, when the job execution request is interrupted in this manner, the print document data or print document received last by the print server is regarded as the final document and is thus printed. Also, when the print server is crashed while it is receiving the print document data or print document and it is restored later, a similar processing is executed.

However, according to the above-mentioned conventional manner of processing, it is impossible to add a continuously following document to the interrupted job. That is, in order for a user to be able to obtain such print output as imagined, the interrupted job must be cancelled once and, after then, the document must be transmitted again from the very beginning.

SUMMARY OF THE INVENTION

The present invention aims at eliminating the drawbacks found in the above-mentioned conventional printer control system. Accordingly, it is an object of the invention to provide a printer control system which, even if a request for execution of a job is interrupted during reception of a document, is able to continuously add to the interrupted job a document which continues with the interrupted document of the job, without canceling the same job.

In attaining the above object, according to the invention, there is provided a printer control system for carrying out print processing and execution of a printer in a job, the printer control system comprising monitor means for monitoring whether print document data or a print document consisting of a group of the print document data from a client has been received within a given time; schedule attribute judging means for judging whether schedule attribute of the print document data or the print document is a before-complete schedule attribute to execute a scheduling operation in which processings of a job are executed sequentially one by one each time when the print document data is received, or an after-complete schedule attribute to execute a scheduling operation in which proceedings of the job are executed collectively after the print document is received; print document data processing means, when the monitor means judges in the case of the before-complete schedule attribute that a current piece of the print document data has not been received within the given time, for processing previously received pieces of the print document data down to the last piece of the print document data that has been received just before the unreceived current piece of the print document data; print document processing means, when the monitor means judges in the case of the after-complete schedule attribute that a current piece of the print document has not been received within the given time, for processing previously received pieces of the print document down to the last piece of the print document that has been received just before the unreceived current piece of the print document; and document addition judging means for judging from a print condition of the print document data or the print document whether the job interrupted but received later again can be added to the last piece of the print document data or to the last piece of the print document or not.

DETAILED DESCRIPTION OF THE PREFERRED EMBODIMENT

Figure 1:
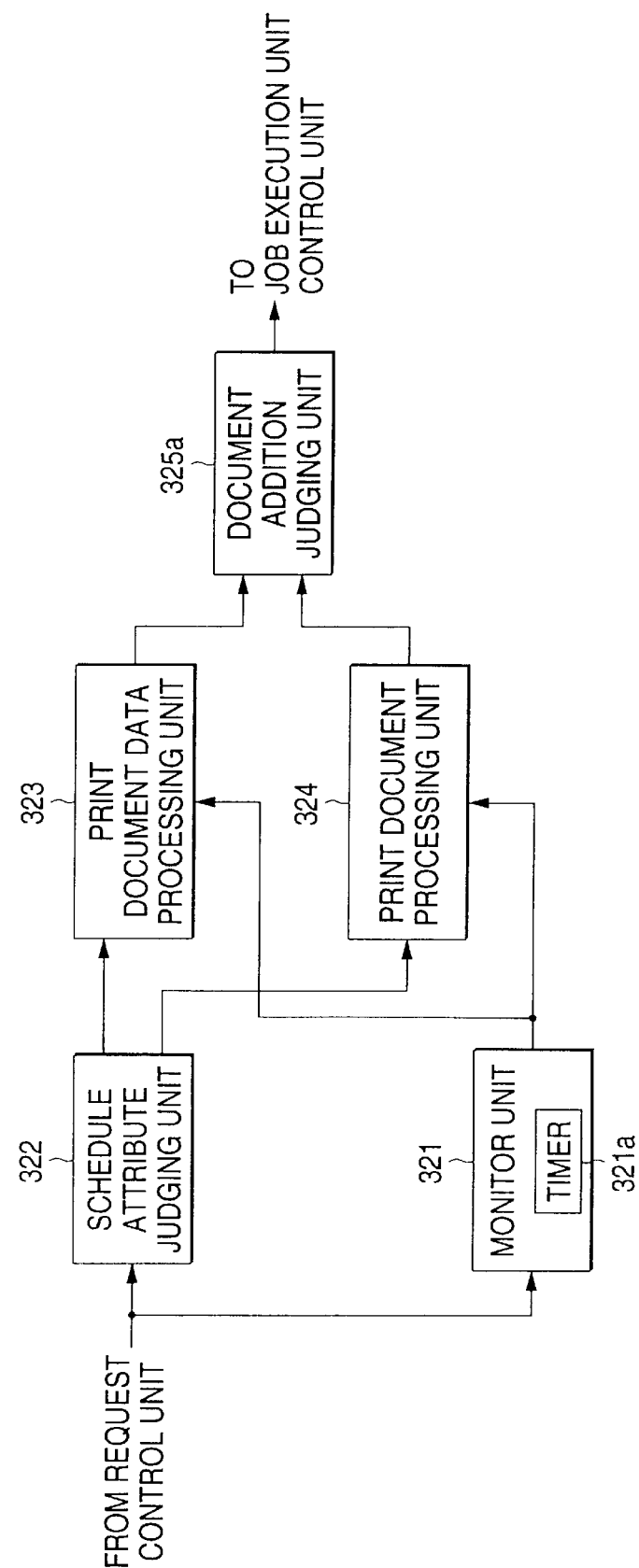
FIG. 1 is a block diagram of the main portions of a printer control system according to the invention, showing the principles of the invention.

Now, description will be given below of an embodiment of a printer control system according to the invention with reference to the accompanying drawings. At first, FIG. 1 shows the principles of the main portions of the printer control system according to the invention. The printer control system comprises a monitor unit 321 which is used to monitor whether the printer control system has received a document within a given time, a schedule attribute judging unit 322 which is used to judge the schedule attribute of the processing of a print job, a print document data processing unit 323 used to process print document data, a print document processing unit 324 used to process a print document, and a document addition judging unit 325a for judging whether a re-received document is to be added to an interrupted document or not.

Next, description will be given below of the operation of the respective units of the print control system. Firstly, the monitor unit 321 monitors whether a series of documents for printing respectively transmitted from a client have been received within a given time or not. Usually, a plurality of documents are transmitted with respect to a job. However, according to the present print control system, it is necessary to confirm that a document has been received normally, before the next document can be received.

For example, when there occurs a state in which the next document cannot be received because of the failure of a network or the like, the print control system waits indefinitely for the reception of the next document. Therefore, in order to avoid this, the monitor unit 321 monitors whether or not a given period of time has passed after confirmation of reception of a certain document, that is, a timer 321a has been timed out.

Also, in the case of normal reception, the timer 321a is set at the time of the normal reception, and the timer 321a is reset by the reception of the next document before it is timed out.

The schedule attribute judging unit 322 judges whether the schedule attribute transmitted from a request control unit and instructed by a client is a before-complete attribute or an after-complete attribute. The request control unit will be described later.

Now, when the schedule attribute judging unit 322 judges that the schedule attribute is a before-complete attribute, then the print document data processing unit 323 executes the proceedings of previously received print document data down to the last print document data that has been received just before the judgment of the before-complete attribute.

On the other hand, when the schedule attribute judging unit 322 judges that the schedule attribute is an after-complete attribute, then the print document processing unit 324 executes the processings of previously received print documents down to the last print document that has been received just before the judgment of the after-complete attribute.

The document addition judging unit 325a checks the print condition of the print document data or print document and, after then, judges from this print condition check whether a job interrupted but received later again can be added to the last print document data or to the last print document or not, before it transmits the same to a job execution unit control unit. The job execution unit control unit will be discussed later.

Figure 2:
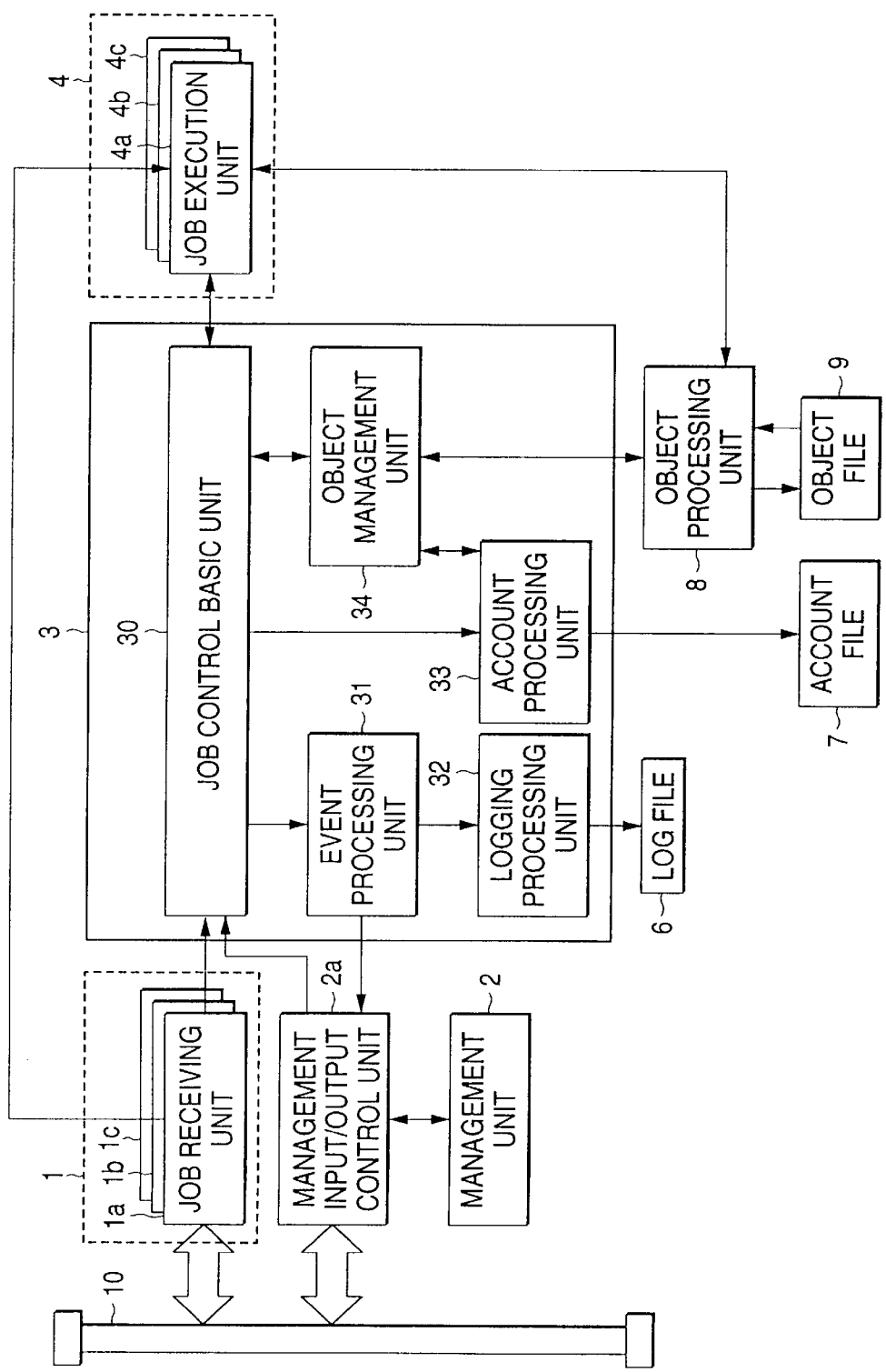
FIG. 2 is a block diagram of the whole of the printer control system.

Next, description will be given below of the whole structure of the printer control system. Here, FIG. 2 is a block diagram of the whole structure of the printer control system. In particular, the present printer control system comprises a job receiving unit 1 which is connected to a network 10, a management unit 2, a management input/output control unit 2a, a job control unit 3, a job execution unit 4, a log file 6, an account file 7, an object processing unit 8, and an object file 9.

The job control unit 3 includes a job control basic unit 30, an event processing unit 31, a logging processing unit 32, an account processing unit 33, and an object management unit 34.

The job receiving unit 1 receives through the network 10 jobs input from the work stations of clients, unifies the jobs transmitted in various formats into the format of the job specified by the printer control system, and then supplies the jobs to the job control basic unit 30 of the job control unit 3. Also, in order to be able to cope with various protocols respectively adapted to the kinds of the machines of the clients, as the job receiving unit 1, there are prepared a plurality of job receiving unite and, in the illustrated embodiment, there are prepared three kinds of job receiving units 1a, 1b and 1c. Further, each of the job receiving units 1 includes a spool in which the document data of the document contained in the job received can be stored.

The management unit 2 receives an operation from a system manager or the like and, through the management input/output control unit 2a which is an interface, requests a processing on the management and control to the job control unit 3. Since the management input/output control unit 2a is connected to the network 10, it is also possible to make a request from the client side for acquisition of necessary information such as the end of printing and the like.

The job control unit 3 receives a print processing job from the job receiving unit 1, analyzes the contents of the job, and request the execution of the job to the job execution unit 4. Also, the job control unit 3 receives, through the management input/output control unit 2a, a control request for management from the management unit 2, and executes a processing corresponding to the contents of the control request.

The job execution unit 4 is a printer which executes a job called a printing operation, or a converter which executes a job to convert the format of a print document requested for printing from a client into a page description language supported by a printer, for example, PostScript (which is a trademark given to Adobe Systems, U.S.). Therefore, the number of execution instructions to be given to the job execution unit 4 from the job control unit 3 depends on the contents of a job, that is, it is not limited to one but a required number of execution instructions can be repeated.

As a device which is used to execute a job, there are available various printers or various converters. In the illustrated embodiment, as an example, there are shown three job execution units 4a, 4b and 4c.

The event processing unit 31 is used to perform a processing to notify various events issued from the job control unit 3 such as job end, job cancel and the like to the management unit 2 through the management input/output control unit 2a. Also, the various events are respectively used to execute processings to write their respective issue histories to the log file 6 through the logging processing unit 32.

The account processing unit 33 collects from the job control basic unit 30 set information on a job such as what function is used and the like, collects from the object file 9 account information on the number of pages of a document and the like requested through the object management unit 34 and object processing unit 8, and writes the thus collected information to the account file 7.

The object management unit 34 is used to manage jobs, which have been received by the job receiving unit 1, as an object, that is, it writes attribute information on a job requested by a client to the object file 9 by use of the object processing unit 8, or, as the need arises, reads out necessary object information from the object file 9 through the object processing unit 8.

Also, the object processing unit 8, when the job execution unit 4 consisting of, for example, a printer takes out the document data of a document from the spool of the job receiving unit 1 and prints the same, reads out from the object file 9 document attributes such as the location of the present document data, the size of the paper on which the document data are to be printed, and the like, and notify the job execution unit 4 of the thus read-out document attributes.

Figure 3:
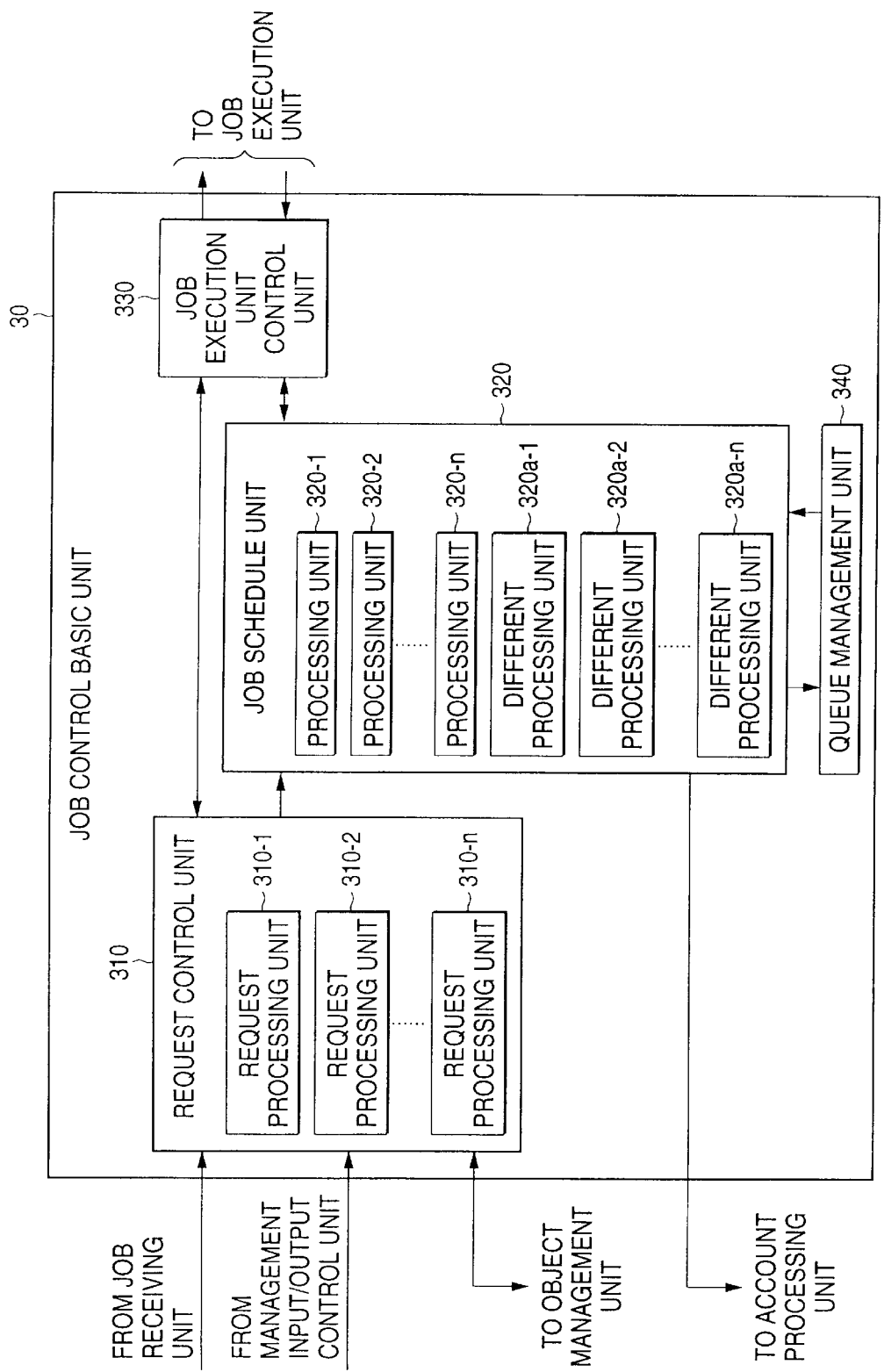
FIG. 3 is a block diagram of the structure of a job control basic unit employed in the printer control system.

Next, description will be given below of the structure of the job control basic unit. Here, FIG. 3 is a block diagram of the structure of the job control basic unit. In FIG. 3, the job control basic unit 30 comprises a request control unit 310, a job schedule unit 320, a job execution unit control unit 330, and a queue management unit 340. The request control unit 310 is used to perform a processing between the job receiving unit 1 and itself, a processing between the management unit 2 and itself through the management input/output control unit 2a, and a processing between the object management unit 34 and itself, while the job execution unit control unit 330 is used to perform a processing between the job execution unit 4 and itself.

In particular, when the request control unit 310 accepts a request for a job from the job receiving unit 1, analyzes the job request and recognizes it as the information of the job, the request control unit 310 requests the object management unit 34 to generate the information of the job and, in accordance with the thus generated job information, requests the job schedule unit 320 to perform a scheduling processing. Also, the request control unit 310 receives a request from the management unit 2, for example, receives therefrom an instruction irrelevant to a job such as stop of a printer or the like, and hands over this instruction to the job execution unit control unit 330, while the request control unit 310 receives a response from the job execution unit 4 through the job execution unit control unit 330 and returns it to the management unit 2.

The job schedule unit 320 takes out a requested object from the object management unit 34 and the object of the associated job execution unit 4, executes a job scheduling processing, and uses the queue management unit 340 to execute a job queuing processing, for example, to create exclusive queues respectively corresponding to the job execution units 4.

Also, the job schedule unit 320 requests the processing of the job to the job execution unit 4 through the job execution unit control unit 330. Here, the execution of the queuing processing is carried out by the queue management unit 340 in accordance with the instruction of the job schedule unit 320. Further, the job schedule unit 320 transmits information necessary for an account processing to the account processing unit 33.

In addition, according to jobs respectively received thereby, the request control unit 310 generates a plurality of request processing units 310-1, 310-2, - - -, and 310-n. At the same time, the job schedule unit 320 generates a plurality of processing units 320-1, 320-2, - - -, and 320-n which are respectively used to perform processings on the requests from the request control unit 310, as well as a plurality of different processing units 320a-1, 320a-2, - - -, and 320a-n which are respectively used to perform processings with respect to the job execution unit control unit 330. These processings are executed in parallel with high efficiency.

Here, each of the above-mentioned processing units 320-1, 320-2, - - -, and 320-n includes therein the monitor unit 321, schedule attribute judging unit 322, print document data processing unit 323, print document processing unit 324, and document addition judging unit 325a.

Figure 4:
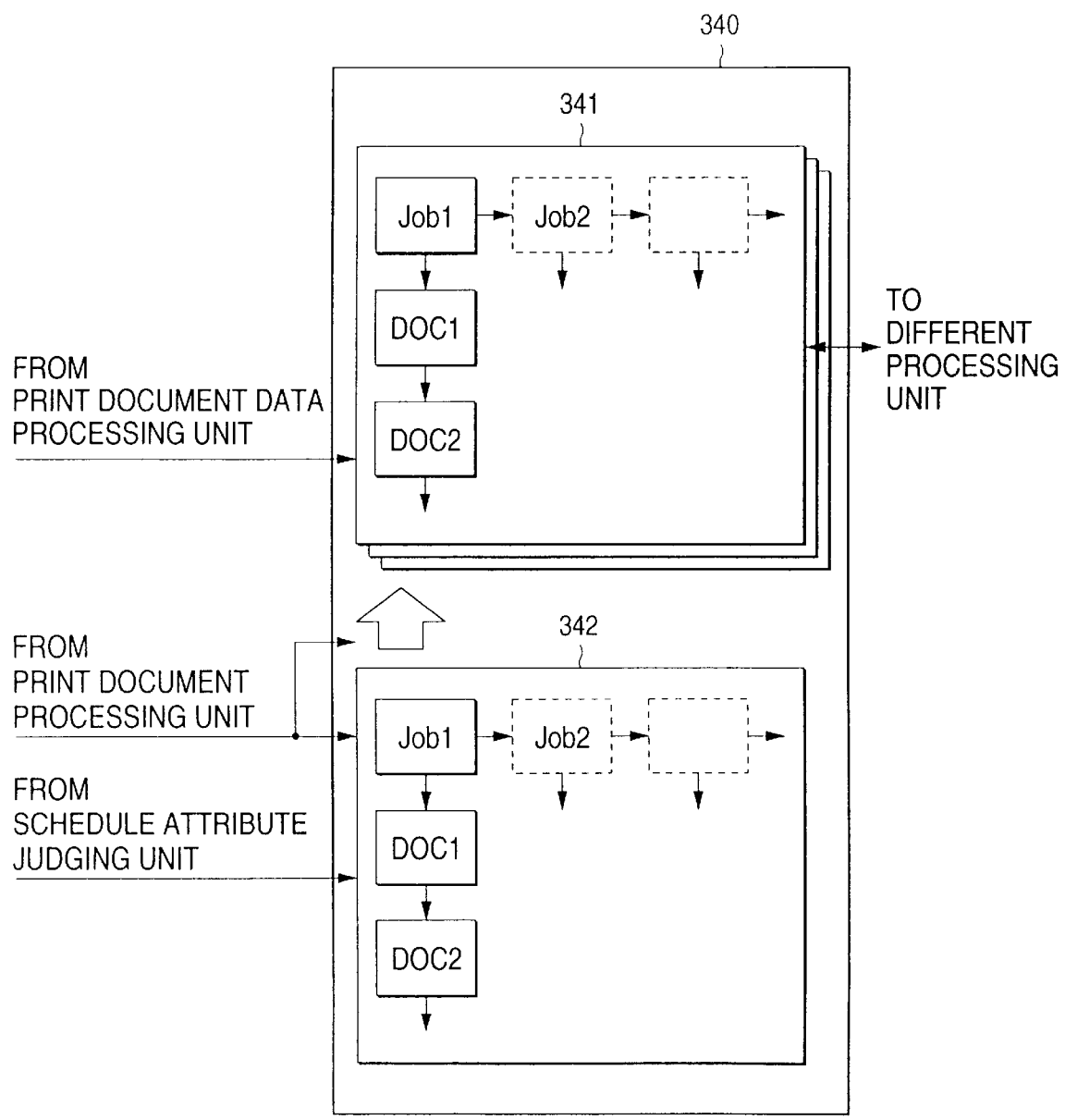
FIG. 4 is a structure view of an example of a queue management unit employed in the printer control system.

Next, description will be given below of the queue management unit. Here, FIG. 4 is a structural view of an example of the queue management unit. In FIG. 4, the queue management unit 340 comprises a printer queue 341 and a reception waiting queue 342. The printer queue 341 is created for each printer. The printer queue 341 and reception waiting queue 342 have the same structure. If a processing on a certain job is requested, then there are generated a job block Job1 and a document block DOC1, for example, and, if the next document is received, there is generated a document block DOC2 below the document block DOC1.

Also, if the next job processing request is received, then there is generated a job block Job2 following the job block Job1. In the case of a before-complete processing, it is queued directly in the printer queue 341. On the other hand, for an after-complete processing, it is firstly queued in the reception waiting queue 342 and, if it is found that the last document has been received, then the queue is transferred to the printer queue 341, where the job, that is, printing is executed. If it is judged that the job is ended, then the leading job block and all the document blocks connected with the leading job block are removed from the printer queue 341.

Figure 5:
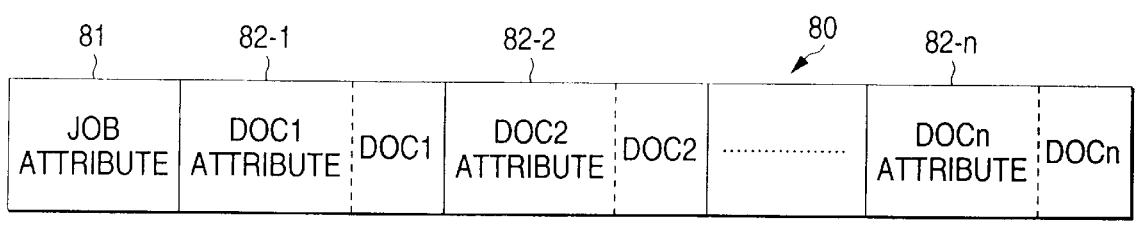
FIGS. 5 (A) through 5 (C) are structure views of an example of document print request data employed in the printer control system.
Figure 5:
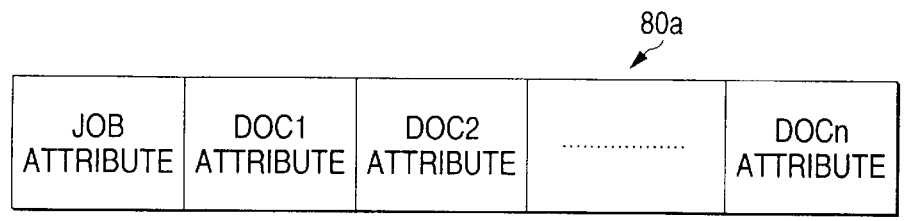
Figure 5:
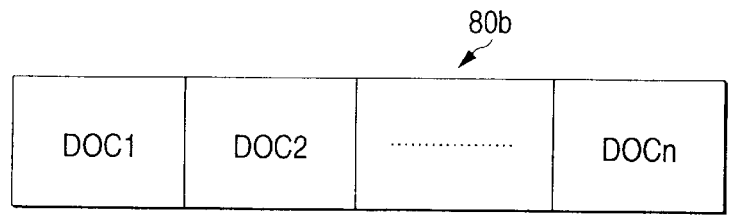

Next, description will be given below of the structure of the document print request data that are transmitted from a client. Here, FIGS. 5 (A) through 5 (C) show an example of the document print request data structure. The structure of data 80 to be transmitted from the client, as shown in FIG. 5 (A), includes a job attribute 81 serving as the header portion thereof, and n pieces of document data 82-1, 82-2, - - -, and 82-n serving as the data portion thereof. In each of the document data 82-1, 82-2, - - -, and 82-n, there is added a document attribute to the entity of the document thereof.

The data 80 received, as shown in FIGS. 5 (B) and 5 (C), is divided into attribute data 80a and document data 80b. The document data 80b is stored in the spool of the job receiving unit 1, whereas the attribute data 80a is stored in the object file 9 after the file pass names of the respective pieces of document data in the spool are added to the respective pieces of the attribute data.

Here, as the job attribute, for example, there are available the name of a job "job-name", the client of a job "job-owner", "user-name", the name of a printer to be requested "printer-name-requested", the schedule attribute "job-scheduling", and the like. As for the schedule attribute, either the after-complete processing or before-complete processing can be specified and, further, it is also possible to specify that the schedule attribute complies with a schedule attribute which is set on the printer control system side.

On the other hand, as the document attribute, there are available the description of a document "document-description", the specification of a page description language "document-format", the specification of an output bin "output-bin-name", the specification of paper size "media-used", the specification of a paper feeder "feeder-used", the specification of both-side or one-side printing "sides", and the like. These document attributes can be specified for each document.

Here, due to the fact that there are stored a plurality of pieces of document data in the data portion of the data 80 to be transmitted from the client, the data 80 implies that a plurality of document print requests must be processed as a job.

Figure 6:
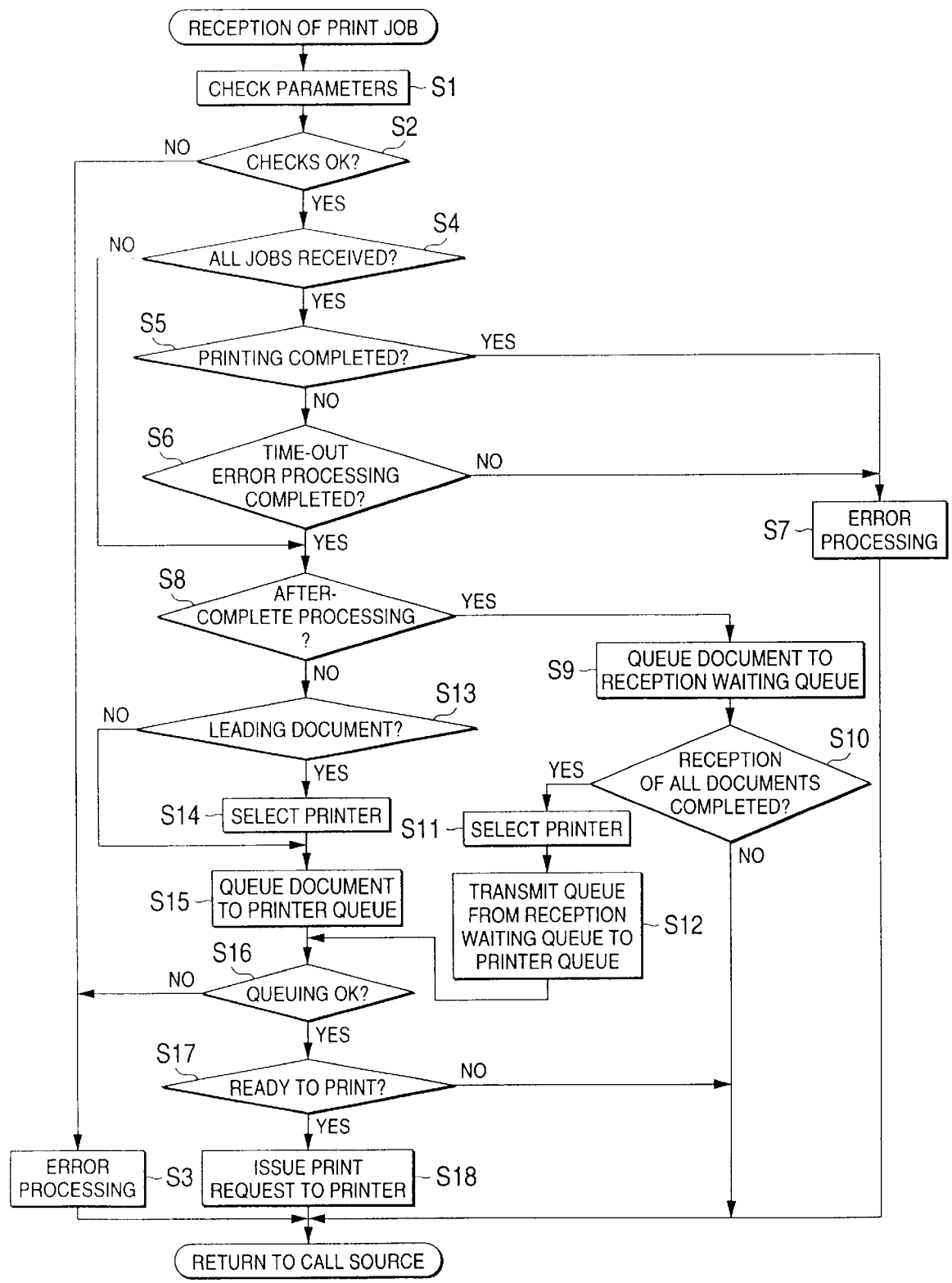
FIG. 6 is a flow chart of processings to be executed by a job schedule unit employed in the printer control system.

Next, description will be given below of the processing to be executed by the job schedule unit 320. Here, FIG. 6 is a flow chart of the processing to be executed by the job schedule unit 320. At first, before starting the processing of the job schedule part 320, in the request control unit 310, when a job is received, it is checked whether the attributes of the job and document, that is, parameters are correct or not (Step S1). Next, it is judged whether the checks are all OK or not (Step S2), and, if it is judged that one or more incorrect parameters are present, then the processing advances to an error processing step (Step S3). Next, it is checked whether jobs are all received or not (Step S4) and, if it is found that the reception of all the jobs is not completed, then the processing goes to step S8. After then, it is checked whether the printing of the jobs received is completed or not (Step S5) and, if it is found completed, then the processing advances to an error processing step (Step S7). Next, it is judged whether the processing of a time-out error is completed or not (Step S6) and, if not completed, then the processing advances to the error processing step (Step S7).

In the job schedule part 320, in particular, in the schedule attribute judging unit 322 thereof, it is checked whether the schedule attribute is an after-complete processing or a before-complete processing (Step S8). If it is judged that it is an after-complete processing, then the received document is queued in the reception waiting queue 342 of the queue management unit 340 (Step S9). Next, in the print document processing unit 324, it is checked whether the received document is the last document or not and also whether the reception of all the documents is completed or not (Step S10). Here, if the reception of all the documents is not completed, then the processing waits for the reception of the next document. On the other hand, if completed, then the processing advances to a printer selecting step (Step S11), and the queue is transferred from the reception waiting queue 342 to the printer queue 341 (Step S12).

In the judgment of Step S8, if the schedule attribute is judged to be a before-complete processing, then it is firstly judged whether the document received is the leading document or not (Step S13). If it is found to be the leading document, then a printer is selected (Step S14) and, if not, then, since the selection of a printer is already completed, the printer selecting processing is bypassed and the document is queued in the printer queue 341 (Step S15).

Next, it is checked whether the above queuing processing is executed correctly or not (Step S16), and it is further checked whether the selected printer is ready to print or not (Step S17). If the printer is found ready to print, then a print request is issued to the printer through the job execution unit control unit 330 (Step S18). On the other hand, if the printer is not ready to print because it is in use or for some reason, then the processing waits until the printer becomes ready to print.

As has been described heretofore, according to the invention, there is provided the document addition judging unit which can judge whether a continuing document can be added to an interrupted print job or not. The provision of the document addition judging unit eliminates the need for an operation to cancel the interrupted print job once and transmit again a document from the beginning, which makes it possible to reduce the burden of a user to a great extent.

What is claimed is:

1. A printer control system for carrying out print processing and execution of a printer in a job, said printer control system comprising:

monitor means for monitoring whether print document data or a print document consisting of a group of the print document data from a client has been received within a given time;

schedule attribute judging means for judging whether schedule attribute of the print document data or the print document is a before-complete schedule attribute to execute a scheduling operation in which processings of a job are executed sequentially one by one each time when the print document data is received, or an after-complete schedule attribute to execute a scheduling operation in which processings of the job are executed collectively after the print document is received;

print document data processing means, when said monitor means judges in the case of the before-complete schedule attribute that a current piece of the print document data has not been received within the given time, for processing previously received pieces of the print document data down to the last piece of the print document data that has been received just before the unreceived current piece of the print document data;

print document processing means, when said monitor means judges in the case of the after-complete schedule attribute that a current piece of the print document has not been received within the given time, for processing previously received pieces of the print document down to the last piece of the print document that has been received just before the unreceived current piece of the print document; and document addition judging means for judging from a print condition of the print document data or the print document whether the job interrupted but received later again can be added to the last piece of the print document data or to the last piece of the print document or not.

2. The printer control system according to claim 1, wherein said monitor means includes a timer for detecting that a given period of time has passed after confirmation of reception of a certain document.

3. The printer control system according to claim 1, wherein said schedule attribute judging means judges based on job information supplied from a request control unit.

* * * * *